United States Patent [19]

Bauriedel et al.

[11] 4,184,005
[45] Jan. 15, 1980

[54] PROCESS OF SOLVENT-FREE LAMINATION USING ISOCYANATE/AMINE ADHESIVES

[75] Inventors: Hans Bauriedel, Dusseldorf; Rainer Hasenkamp, Erkrath, both of Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 898,023

[22] Filed: Apr. 20, 1978

Related U.S. Application Data

[63] Continuation-in-part of Ser. No. 738,439, Nov. 13, 1976.

[30] Foreign Application Priority Data

Nov. 4, 1975 [DE] Fed. Rep. of Germany ....... 2549371
Apr. 27, 1977 [DE] Fed. Rep. of Germany ....... 2718615

[51] Int. Cl.$^2$ .................. B32B 7/04; B32B 31/06
[52] U.S. Cl. .................................. 428/420; 156/310; 156/324; 156/314; 156/331; 427/407 R; 428/424; 428/425; 526/342; 528/61; 528/68
[58] Field of Search ................. 156/310–324, 156/314–331; 427/333–407 R, 340; 428/420–425; 526/342; 528/61–68

[56] References Cited

U.S. PATENT DOCUMENTS

| | | | |
|---|---|---|---|
| 2,929,800 | 3/1960 | Hill | 428/425 |
| 3,267,050 | 8/1966 | Kuryla et al. | 528/68 |
| 3,391,054 | 7/1968 | Lewis et al. | 156/331 |
| 3,490,987 | 1/1970 | Bauriedel | 156/331 |
| 3,598,671 | 8/1971 | Wortman | 156/310 |
| 3,666,788 | 5/1972 | Rowton | 528/68 |
| 3,668,173 | 6/1972 | Wooster et al. | 528/61 |
| 3,684,639 | 8/1972 | Keberle et al. | 156/331 |
| 3,840,419 | 10/1974 | De Keyser et al. | 156/324 |

Primary Examiner—John T. Goolkasian
Assistant Examiner—J. J. Gallagher
Attorney, Agent, or Firm—Hammond & Littell

[57] ABSTRACT

A process for the production of laminated films employing a two component non-solvent adhesive system, which comprises the steps of applying a thin film of at least one polyether having at least two terminal isocyanate groups and a molecular weight between 2000 and 5000 to one of two films to be bonded together, applying a thin film of at least one long chain compound having at least two reactive terminal amino groups to the other film to be bonded, the application of both thin films being in such amounts that the molar ratio of isocyanate groups to amine groups is from 1:1 to 5:1 and the two components together being present in an amount of 0.5 to 5.0 gm/m$^2$, pressing the coated sides of the two coated films together and recovering said laminated films.

16 Claims, No Drawings

PROCESS OF SOLVENT-FREE LAMINATION USING ISOCYANATE/AMINE ADHESIVES

REFERENCE TO PRIOR APPLICATION

This application is a continuation-in-part of application Ser. No. 738,439, filed Nov. 13, 1976.

FIELD OF THE INVENTION

The invention relates to a method for the production of laminated films using solvent-free adhesives comprising at least one multi-functional isocyanate and at least one multi-functional reactive amine.

THE PRIOR ART

Laminated films are generally produced by means of laminating adhesives containing solvents which adhesives are applied by rolling onto a sheet web. In this method of production, after evaporation of the solvent, joining of one sheet web to the second web is effected under pressure for a short period of time.

In this method, which is known as dry lamination, almost exclusively polyurethane systems, containing solvents, in the form of moisture-hardening prepolymers with isocyanates in the terminal position or two-component polyol-polyisocyanate mixtures, are used as adhesives. The recent restrictions on the release of solvents into the atmosphere require the absorption or afterburning of the solvent-air mixture as a costly step in the process.

OBJECTS OF THE INVENTION

It is an object of the present invention to provide an improved method for the production of laminated films using an adhesive system which which is free of solvents and can thus be worked with less danger of fire or explosion, as well as a more economical processing method.

It is another object of the present invention to provide a method for the production of laminated films, which gives clear films with good adhesive strength in a manner which is technically inexpensive.

It is a further object of the present invention to provide a process for producing laminated films employing a two component non-solvent adhesive system, which comprises the steps of applying a thin film of at least one polyether having at least two terminal isocyanate groups and a molecular weight between 2000 and 5000 to one of two films to be bonded together, applying a thin film of at least one long chain compound having at least two reactive terminal amino groups to the other film to be bonded, the application of both thin films being in such amounts that the molar ratio of isocyanate groups to amine groups is from 1:1 to 5:1 and the two components together being present in an amount of 0.5 to 5.0 gm/m$^2$, pressing the coated sides of the two coated films together and recovering said laminated films.

These and other objects of the present invention well become more apparent as the description thereof proceeds.

DESCRIPTION OF THE INVENTION

In order to obtain the above objects and to overcome the drawbacks of the prior art, the present invention provides a method for producing laminated films by applying a solvent-free adhesive comprising at least one multi-functional isocyanate to one of two films to be bonded together and a solvent-free adhesive comprising at least one multi-functional reactive amine to the other film and pressing the two coated films surfaces formed together for a short period of time.

More particularly, the present invention provides a process for producing laminated films employing a two component non-solvent adhesive system, which comprises the steps of applying a thin film of at least one polyether having at least two terminal isocyanate groups and a molecular weight between 2000 and 5000 to one of two films to be bonded together, applying a thin film of at least one long chain compound having at least two reactive terminal amino groups to the other film to be bonded, the application of both thin films being in such amounts that the molar ratio of isocyanate groups to amine groups is from 1:1 to 5:1 and the two components together being present in an amount of 0.5 to 5.0 gm/m$^2$, relative to the area of contact of the two films, pressing the two coated sides of the two coated films together and recovering said laminated films.

The pressing together of the two films need only be effected for a short period of time to achieve satisfactory adhesion.

Isocyanates which are at least bi-functional and suitable for use in the method of the present invention can be produced in a manner known per se through the conversion or reaction of anhydrous polyether diols with at least bi-functional isocyanates in a molar ratio whereby one mole of said at least bi-functional isocyanate is employed per hydroxyl group. Preferred polyether diols are the polyoxyalkylene glycols derived from alkylene glycols containing 2 to 4 carbon atoms. Consequently, polyoxyethylene glycol and/or polyoxypropylene glycol and/or polyoxytetramethylene glycol (produced by ring-opening polymerization of tetrahydrofuran) are suitable. For the reaction with polyether diols mainly relatively low-molecular weight isocyanates, preferably alkylene diisocyanates having 3 to 12 carbon atoms in the alkylene, cycloalkylene diisocyanates having 5 to 12 carbon atoms in the cycloalkyl and aromatic hydrocarbon diisocyanates having 6 to 15 carbon atoms in the aromatic hydrocarbon, such as hexamethylenediisocyanate, trimethylhexamethylene diisocyanate, dicyclohexylmethane diisocyante, diphenylmethane diisocyanate, isophorone diisocyante, tolulyene diisocyanate (isomeric mixture), and others, are primarily suitable for the reaction with the polyether diols. For practical, particularly toxicological, reasons, diphenylmethane diisocyanate is preferred.

A reaction conversion ratio of 1.8 up to 2.2:1 is preferably suitable for the formation of the isocyanate polyether diol adduct, the ratio being of moles diisocyanate to moles diol. A lower conversion ratio is theoretically also possible, on the condition that a too highly viscous adduct is not thereby produced, the use of which no longer permits satisfactory machine lamination. A possibly higher conversion ratio than 2.2:1 would also be tolerable in principle, if there were no doubts on toxicological grounds regarding the high content of free diisocyanate in this case.

Attention should be paid to the fact that the resulting isocyanate compounds do not exceed a viscosity (Brookfield) of approximately 10,000 cP during processing. If required, this reaction component can also be applied at high temperature up to approximately 80° C. In general, however, a temperature of 50° to 65° C. is preferred.

Applications of laminating adhesives which are carried out only with the adducts, having at least two terminal isocyanate groups, as isocyanate component, in combination with the amine compounds described below, as amine component, give sufficient adhesiveness. It has, however, been discovered that this adhesiveness can be considerably increased if 0.5 to 20%, preferably 1.0 to 10%, by weight of a compound having at least three isocyanate groups is added to the isocyanate adduct, wherein said percentages by weight are in relation to the isocyanate adduct. By modifying the isocyanate component in this manner a higher initial adhesiveness is, in particular, achieved as well as, moreover, an improved final adhesiveness. The reaction products of multi-functional alcohols, such as alkanepolyols having 3 to 10 carbon atoms and 3 to 6 hydroxyl groups and cycloalkane polyols having 6 to 8 carbon atoms, and 3 to 6 hydroxy groups, and diisocyanates, such as the above-indicated diisocyanates, (using a conversion ratio of 1 mol diisocyanate per hydroxyl group in the alcohol) are suitable as the addition compounds having at least three isocyanate groups, as e.g., the conversion product of trimethylolpropane and toluene diisocyanate, as well as the reaction products of one mole water and three moles diisocyanate, such as the above-indicated diisocyanates, as e.g., hexamethylene diisocyanate, as well as other aromatic triisocyanates, preferably phenyl or phenyl alkane triisocyanates containing from 6 to 22 carbon atoms and 1 to 3 phenyl groups, such as 4,4',4"-triisocyanatotriphenylmethane, and also polyisocyanates such as polymethylenepolyphenyl isocyanate.

In order that the resulting isocyanate mixtures can be easily applied to the sheet web during machine lamination they should be heated in the coating pan to lower the working viscosity. When heating the isocyanate mixtures, a maximum temperature of 80° C. should not be exceeded. In general a temperature of 60° C. is completely sufficient. Up to this temperature it was established by measurements taken at the laminating machine that no isocyanate concentration exceeding the MAK value of 0.02 ppm occurred in the workplace atmosphere during lamination with the isocyanate component described in Example 1 below of this application.

The second reaction component which is used for the method of the present invention is an at least bi-functional amine. At least two amino groups must be present which can be both primary and secondary. Compounds of this type are known and can be produced in a known manner.

A preferred basic framework upon which this amino compound can be built up is the polyether diols or oligomeric glycols such as the polyoxyalkylene glycols having from 2 to 4 carbon atoms in the alkylene. In accordance with an advantageous embodiment one proceeds by adding acrylonitrile onto the polyether diols. The adducts which thereby result are then hydrogenated in a known manner, whereby primary amino groups are formed from the nitrile groups. For the production of the two reaction components of the solvent-free laminating adhesive those oligomeric glycols or polyether glycols are preferred, which are derived from polyoxyethylene glycol, polyoxypropylene glycol, and polyoxytetramethylene glycol of a molecular weight of between 200 and 4500, preferably between 300 and 2000.

It is further possible to start from relatively low-molecular weight diamines having a chain length of 2 to 18 carbon atoms, which can also be partially replaced by oxygen atoms, and to react these diamines with compounds containing at least two functional groups which are capable of reacting with an amine (to thereby effect a chain lengthening). Amines of this type are, for example:

$H_2N-CH_2-CH_2-CH_2-O-(CH_2)_{2-4}-O-CH_2-CH_2-CH_2-NH_2$, 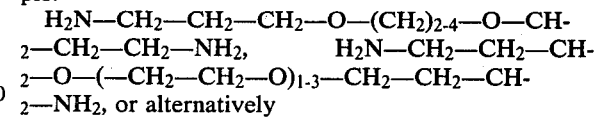$H_2N-CH_2-CH_2-CH_2-O-(-CH_2-CH_2-O)_{1-3}-CH_2-CH_2-CH_2-NH_2$, or alternatively

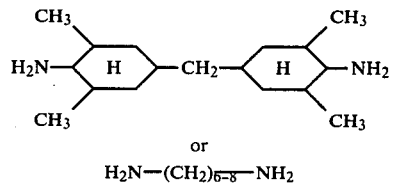

or $H_2N-(CH_2)_{6-8}-NH_2$

The functional groups of the chain lengthening agents can be, for example, epoxide or isocyanate radicals or also $\alpha,\beta$ unsaturated esters or halogen atoms. The OH groups, secondary amino groups or urea groupings which form during this reaction or the ester groupings introduced may have a favorable effect on the adhesion or strength of the adhesive bond under certain circumstances.

The compound containing at least two epoxide radicals can be a diepoxide or diglycidyl compound having the formulae

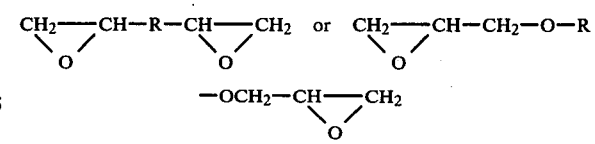

wherein R is an aliphatic or cycloaliphatic radical with up to 25 carbon atoms, as for example, alkylene having 1 to 25 carbon atoms or cycloalkylene having 5 to 25 carbon atoms, such as methylene, ethylene, propylene, neopentylene, hexylene, dodecylene, cyclohexylene, dicyclohexyl, methylene dicyclohexyl or, alternatively, polyoxyalkylene having 2 to 4 carbon atoms in the alkylene elements such as radicals derived from dioxyethylene glycol or trioxyethylene glycol. The diamines can be diprimary amines corresponding to the general formula $H_2N-R'-NH_2$, where R' represents, for example, alkylene having 2 to 18 carbon atoms such as ethylene, butylene, hexylene polyoxyalkylene having 2 to 4 carbon atoms in the alkylene, such as dioxyethylene, dioxypropylene, or, alternatively, trioxyethylene. On chain lengthening of the amines using 2 moles of a diamine for each mole of diepoxide, one obtains compounds containing two terminal primary amino groups of the general formula

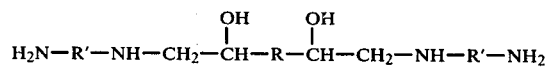

In the case of chain lengthening with isocyanates, such as the above-indicated diisocyanates, as for example, toluene diisocyanate, hexamethylene diisocyanate and isophorone diisocyanate, using again 2 moles of diamine to 1 mole diisocyanate, one obtains compounds containing two terminal amino groups and urea groups, of the general formulas

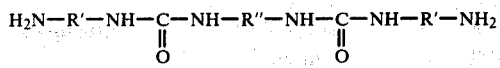

in which R' has the meaning given above, while R" represents the radical of the isocyanate used.

When using (meth) acrylic acid esters of glycols (for example tri- or tetraoxyethylene glycol di(meth)acrylic ester) for chain lengthening, one obtains compounds of the general formula

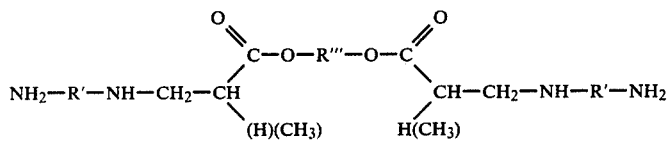

in which R' again has the same significance as above, and R''' represents the dialcohol radical of the (meth) acrylic ester, i.e., the tri-, or tetraoxyethylene glycol radical in the case mentioned by way of example. The indication H(CH$_3$) shows the configuration with a diacrylate (H) or a dimethacrylate (CH$_3$). It will be appreciated that one can also proceed from other di(meth)acrylic acid esters of glycols, such as alkylene glycols containing 2 to 18 carbon atoms, for example, ethylene glycol, propylene glycol, butylene glycol, decane diol, etc.

Finally, it is also possible to effect a chain lengthening with α,ω-dihalides, this being effected in accordance with the same principle in a known manner. In this case, compounds of the general formula

are produced, in which $R^{iv}$ represents a radical of up to 12 carbon atoms and which can optionally contain oxygen, for example, alkylene having 1 to 12 carbon atoms or polyoxyalkylene having 2 to 4 carbon atoms in the alkylene, such as in the case of the tetraoxyethylene radical or trioxypropylene radical, and R' has the same significance as before.

The ratio of diprimary amines to the chain-lengthening agent should be chosen such that approximately 1 mol of difunctional epoxide, isocyanate, (meth)acrylic ester or dihalide is allotted to 2 moles of amine. The reaction forms substantially the desired compounds containing at least two end position primary amino groups and having a molecular weight of approximately 300 to 2000. Advantageously, the viscosity of the aminic component is somewhat less than that of the isocyanate component. It has proved to be practicable to work towards a viscosity of approximately 50 to 1200 cP at 20° C. to 30° C.

The two reaction components are applied each to one of the films by means of rollers in such amounts that the molar ratio of the isocyanate groups of the isocyanate component on one film to the amino groups of the amine component on the other film lies between approximately 1:1 and 5:1. The amount is otherwise measured such that the two components together are present in an amount of 0.5 to 5.0 gm/m$^2$, relative to the area of contact of the two films.

The surfaces of the films coated with the two components are pressed together between a pair of rollers which may also be partially heated. The pressure required is nominal, only that sufficient to bring the two films in contact. Adequate primary adhesion (initial adhesion) is formed on the way to the rolling-up arrangement and, if required, can be increased by applying heat by, for example, hot air.

In many cases it may be advantageous to add 1 to 50% by weight, preferably 1 to 15% by weight, relative to the weight of the long chain compounds carrying the amino groups, of water to said long chain compounds carrying the amino groups. This causes an increase in or earlier attainment of the final strength and affects, in a favorable manner, the sealing ability of the laminated sheet.

The method in accordance with the present invention enables the laminating operation to be carried out at relatively high speeds. There is no need to use drying channels. After the films have been pressed together during machine lamination a sufficiently high initial adhesiveness is formed spontaneously so that the webs do not slip or slide relative to one another and delamination or "telescoping" of the laminated sheet does not occur while it is being wound on. Within seven days after manufacture the adhesiveness reaches its final value during storage at room temperature. The adhesive films are thereafter chemically cross-linked and exhibit a behavior which satisfies all the requirements of packing technology with regard to laminar adhesion and thermal stability, which is a prerequisite for its sealability. The finished laminates are further distinguished by very good optical properties. Very frequently occurring laminating flaws such as "fish eyes" or "orange peel structure" cannot be detected in the laminates.

By means of the twin-component laminating adhesive of the invention all laminates of plastic sheets such as polyethylene, polypropylene, polyester (e.g. polyethylene terephthalate), polyvinyl chloride, polystyrene, polyamide sheet (e.g. polycaprolactam) etc., can be manufactured. Furthermore the production of laminated films is possible by using metal foils, e.g. aluminum foil, and, moreover, by using, various cellulose glasses and paper.

Preferably the films have a thickness of from 6μ to 1 mm. The laminates can be of different film components.

While the description discusses production of film laminates, it is obvious that other materials can be bonded by the adhesive system discussed, utilizing the conditions above.

The present invention will now be further illustrated by references to the following examples:

EXAMPLES

The compounds designated as "aminopropylized" polypropylene glycols in the following examples were produced by addition of acrylonitrile to the polypropylene glycol and subsequent catalytic hydrogenation.

EXAMPLE 1

Component A

Component A consisted of:

2000 gm of the isocyanate adduct of polypropylene glycol, having molecular weight 2000 and diphenylmethane-4,4'-diisocyanate, in the molar ratio 1:2, and
100 gm of the reaction product of 3 moles hexamethylene diisocyanate and 1 mole water.

Physical Characteristics of Component A

Content of free isocyanate groups: 4.2% or 10 m.-eq./gm
Viscosity (Brookfield) at 23° C.: 25,000 cP
Viscosity (Brookfield) at 50° C.: 8,000 cP
Visscosity (Brookfield) at 60° C.: 2,500 cP Component B Component B consisted of:
300 gm aminopropylized polypropylene glycol (average molecular weight 400) and
500 gm of aminopropylized polypropylene glycol (average molecular weight 2000)
The amine content of component B was 2.5 m.-eq./gm.

1.68 gm/m² of the above component A, which was heated to 60° C., was applied by machine to a polyester sheet (sheet thickness 12 μm) and 0.35 gm/m² of the above component B, at room temperature, was applied to a polyethylene sheet of low density polyethylene (sheet thickness 50 μm), which had been pre-heated by a corona discharge. The molar ratio of the isocyanate to the amine component was 1.9:1 (with respect to isocyanate to amine groups). The coated sides of the sheets were pressed together over rollers.

The adhesive film showed a high spontaneous initial adhesiveness (30 seconds after application a peel adhesiveness of 30 p/15 mm at a withdrawal speed of 100 mm/min. was measured).

After a lamination lasting eight hours the above components could also be processed satisfactorily with the formation of a consistently high initial adhesiveness. Due to the increase in viscosity in this case the application quantity of the isocyanate component rose to 1.92 gm/m² while the application quantity of the amine component remained constant at 0.35 gm/m², thus resulting in a molar application ratio of 2.2:1.

After storing the laminate for seven days at room temperature a peel adhesiveness of 350 p/15 mm was obtained. This value was found for a section of the laminate which was produced at the start of the eight-hour period of lamination as well as in one which was produced at the end of the period.

EXAMPLE 2

Component A

Component A consisted of:
2000 gm of the isocyanate adductof polypropylene glycol (average molecular weight 2000) and diphenylmethane-4,4'-diisocyanate, in the molar ratio 1:2.

Physical Characteristics of Component A

Content of free isocyanate groups: 3.4% or 0.81 m.-eq./gm
Viscosity (Brookfield) at 23° C.: 20,000 cP
Viscosity (Brookfield) at 60° C.: 2,000 cP Component B Component B consisted of:
300 gm aminopropylized polypropylene glycol (average molecular weight 400) and
500 gm aminopropylized polypropylene glycol (average molecular weigh 2000)
The amine content of component B was 2.5 m.-eq./gm 2.1 gm/m² of the above compoent A, heated to 60° C., was applied to an aluminum foil (foil thickness 12 mm) and 0.4 gm/m² of the above component B at room temperature was applied to a polyethylene sheet of low density polyethylene (sheet thickness 50 μm), which had been pre-treated by means of a corona discharge. The molar ratio of the components was 1.7:1 (isocyanate: amine groups).

By pressing together the coated sheet sides a sufficiently high initial adhesiveness was reached. (Tensile peel strength: 6 p/15 mm at a withdrawal speed of 100 mm/min obtained 30 seconds after preparation).

After storing the laminate for seven days at room temperature the final strength of (250 p/15 mm) was attained.

EXAMPLE 3

Component A

Component A consisted of:
2000 gm of the isocyanate adduct of polypropylene glycol (average molecular weight 3000) and diphenylmethane-4,4'-diisocyanate, in the molar ratio 1:2, and
100 gm of the reaction product of 3 moles of hexamethylene diisocyanate and 1 mole water.

Physical Characteristics of Component A

Content of free isocyanate groups: 3.3% or 0.79 m.-eq./gm
Viscosity (Brookfield) at 23° C.: 29,000 cP
Viscosity (Brookfield) at 60° C.: 6,000 cP Component B Component B consisted of:
300 gm Aminopropylized polypropylene glycol (average molecular weight 400)
The amine content of component B was 5 m.-eq./gm 2.56 gm/m² of component A, heated to 60° C., was applied to a polyester sheet (sheet thickness 9 μm) and 0.2 gm/m² of component B at room temperature was applied to an aluminum foil (foil thickness 12 μm). The molar ratio of the components was 2:1 (isocyanate: amine groups).

The initial adhesiveness (30 seconds after sticking together) was 15 p/15 mm. The final strength (after seven days) was 300 p/15 mm.

EXAMPLE 4

Component A

Component A consisted of:
2000 gm of the isocyanate adduct of polypropylene glycol (average molecular weight 2000) and diphenyl-4,4'-diisocyanate, in the molar ratio 1:2, and
100 gm of the reaction product of 3 moles of hexamethylene diisocyanate and 1 mole water.

Physical characteristics of Component A

Content of free isocyanate groups: 4.2% or 1.0 m.-eq./gm
Viscosity (Brookfield) at 23° C.: 25,000 cP
Viscosity (Brookfield) at 60° C.: 2,500 cP

Component B

Component B consisted of:

300 gm aminopropylized polypropylene glycol (average molecular weight 400), and
500 gm of aminopropylized polypropylene glycol (average molecular weight 2000), and
20 gm water.

The amine content of component B was 2.44 m.-eq./gm.

2.17 gm/m$^2$ of the above component A, heated to 60° C., was applied to a polyester sheet (sheet thickness 12 μm) and 0.41 gm/m$^2$ of the above component B, at room temperature, was applied to a polyethylene sheet of low density polyethylene (sheet thickness 40 μm), which had been pre-treated by means of a corona discharge. The molar ratio of the components was 2.2:1 (isocyanate to amine groups).

The initial adhesiveness (30 seconds after sticking together) was 10 p/15 mm. The final strength (after three days) was 380 p/15 mm.

The preceding specific embodiments are illustrative of the practice of the invention. It is to be understood, however, that other expedients known to those skilled in the art, or given herein, may be employed without departing from the spirit of the invention or the scope of the appended claims.

We claim:

1. A method for the production of laminated films employing a two-component non-solvent adhesive system, which comprises the steps of
    applying a thin film of a mixture of (a) the reaction product of 1 mole of polyoxyalkylene glycol having 2 to 4 carbon atoms in the alkylene and 2 moles of a diisocyanate, said reaction product having a molecular weight of from 2000 to 5000, and (b) a compound selected from the group consisting of (i) the reaction product of an alkanepolyol having 3 to 10 carbon atoms and 3 to 6 hydroxyl groups or a cycloalkane polyol having 6 to 8 carbon atoms and 3 to 6 hydroxy groups with a diisocyanate, wherein 1 mole of diisocyanate is reacted per hydroxy group of said polyol; (ii) the reaction product of one mole of water and three moles of a diisocyanate; (iii) an aromatic triisocyanate; and (iv) a polyisocyanate, said compound (b) having at least three isocyanate groups being present in an amount of 0.5 to 20% by weight, relative to said reaction product (a), to one of two films to be bonded together,
    applying to the other film to be bonded a thin film of at least one second reaction product of 1 mole of polyoxyalkylene glycol having 2 to 4 carbon atoms in the alkylene with 2 moles of acrylonitrile, which was subsequently catalytically hydrogenated, said reaction product having a molecular weight of from 300 to 2000, the application of both thin films being in such amounts that the molar ratio of isocyanate groups to amine groups is from 1:1 to 5:1 and the two components together being present in an amount of 0.5 to 5.0 gm/m$^2$,
    pressing the coated sides of the two coated films together whereby adhesion between the coated films is initiated, and
    recovering said laminated films.

2. The method of claim 1, wherein reaction product (a) is present in an amount of 1 to 10% by weight, relative to compound (b).

3. The method of claim 1, wherein said compound (b) is the reaction product of one mole of water and three moles of a diisocyanate.

4. The method of claim 1, wherein the diisocyanate is selected from the group consisting of alkylene diisocyanates having 3 to 12 carbon atoms in the alkylene, cycloalkylene diisocyanates having 5 to 12 carbon atoms in the cycloalkyl and aromatic hydrocarbon diisocyanates having 6 to 15 carbon atoms in the aromatic hydrocarbon.

5. The method of claim 3, wherein the diisocyanate is hexamethylene diisocyanate.

6. The method of claim 1, wherein the diisocyanate reacted to form reaction product (a) is diphenylmethane-4,4'-diisocyanate.

7. The method of claim 1, wherein 1 to 50% by weight, relative to said second reaction product, of water is added to said second reaction product.

8. The method of claim 7, wherein 1 to 15% by weight, relative to said second reaction product, of water is added.

9. The method of claim 1, wherein the two films are selected from polyethylene, polypropylene, polyester, polyvinyl chloride, polystyrene and polyamide films.

10. A laminated film produced by the method of claim 1.

11. A method for the production of laminated films employing a two-component non-solvent adhesive system, which comprises the steps of
    applying a thin film of at least one reaction product (a) of 1 mole of polyoxyalkylene glycol having 2 to 4 carbon atoms in the alkylene and 2 moles of a diisocyanate, said reaction product (a) having a molecular weight of from 2000 to 5000, to one of two films to be bonded together,
    applying to the other film to be bonded a thin film of at least one reaction product (b) of 1 mole of polyoxyalkylene glycol having 2 to 4 carbon atoms in the alkylene with 2 moles of acrylonitrile, which was subsequently catalytically hydrogenated, said reaction product (b) having a molecular weight of from 300 to 2000, the application of both thin films being in such amounts that the molar ratio of isocyanate groups to amine groups is from 1:1 to 5:1 and the two components together being present in an amount of 0.5 to 5.0 gm/m$^2$,
    pressing the coated sides of the two coated films together whereby adhesion between the coated films is initiated, and
    recovering said laminated films.

12. The method of claim 11, wherein the diisocyanate reacted to form reaction product (a) is diphenylmethane-4,4'-diisocyanate.

13. The method of claim 11, wherein 1 to 50% by weight, relative to said reaction product (b), of water is added to said reaction product (b).

14. The method of claim 13, wherein 1 to 15% by weight, relative to said reaction product (b), of water is added.

15. The method of claim 11, wherein the two films are selected from polyethylene, polypropylene, polyester, polyvinyl chloride, polystyrene and polyamide films.

16. A laminated film produced by the method of claim 11.

* * * * *